(12) United States Patent
Worman, Jr. et al.

(10) Patent No.: US 7,507,161 B2
(45) Date of Patent: Mar. 24, 2009

(54) PROPSHAFT WITH CONSTANT VELOCITY JOINT ATTACHMENT

(75) Inventors: William E. Worman, Jr., Washington Township, MI (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 12/011,598

(22) Filed: Jan. 28, 2008

(65) Prior Publication Data

US 2008/0132342 A1 Jun. 5, 2008

Related U.S. Application Data

(63) Continuation of application No. 11/089,263, filed on Mar. 24, 2005, now Pat. No. 7,347,785.

(51) Int. Cl.
*F16D 3/227* (2006.01)
(52) U.S. Cl. ............... 464/146; 464/182; 464/906
(58) Field of Classification Search ......... 464/104–146, 464/182, 906
See application file for complete search history.

(56) References Cited

U.S. PATENT DOCUMENTS

| 2,286,498 | A | * | 6/1942 | Miller, Jr. ............... 464/142 |
| 2,559,093 | A | | 7/1951 | Rzeppa |
| 3,186,189 | A | * | 6/1965 | William ............... 464/145 |
| 3,452,558 | A | | 7/1969 | Hutchinson et al. |
| 3,464,232 | A | | 9/1969 | Hutchinson |
| 3,592,884 | A | | 7/1971 | Williams |
| 3,656,318 | A | | 4/1972 | Smith et al. |
| 3,696,638 | A | | 10/1972 | Smith et al. |
| 3,879,960 | A | | 4/1975 | Welschof et al. |
| 3,965,701 | A | * | 6/1976 | Orain ............... 464/144 |
| 4,054,039 | A | | 10/1977 | Takahashi et al. |
| 4,180,344 | A | | 12/1979 | Otsuka et al. |
| 4,205,925 | A | * | 6/1980 | Fisher ............... 464/141 X |
| 5,333,939 | A | | 8/1994 | Krude et al. |
| 5,368,523 | A | * | 11/1994 | Mazziotti ............... 464/144 |
| 5,665,001 | A | * | 9/1997 | Jacob et al. ............... 464/182 |
| 5,788,578 | A | | 8/1998 | Shimizu et al. |
| 6,152,825 | A | | 11/2000 | Doell |
| 6,267,683 | B1 | | 7/2001 | Jacob |
| 6,273,825 | B1 | | 8/2001 | Schwarzler et al. |
| 6,306,045 | B1 | | 10/2001 | Jacob |
| 6,364,779 | B1 | * | 4/2002 | Duddy ............... 464/182 |
| 6,422,947 | B1 | | 7/2002 | Kelly et al. |
| 2004/0137992 | A1 | | 7/2004 | Hildebrandt et al. |

FOREIGN PATENT DOCUMENTS

| CH | 243403 | * | 7/1946 | ............... 464/140 |
| CH | 243403 | * | 12/1946 | ............... 464/140 |

* cited by examiner

*Primary Examiner*—Greg Binda
(74) *Attorney, Agent, or Firm*—Harness, Dickey & Pierce, P.L.C.

(57) ABSTRACT

A propeller shaft assembly includes a substantially cylindrical hollow propeller shaft, a stub shaft and a constant velocity joint having inner race and an outer race drivingly interconnected by a plurality of balls. The stub shaft has a first end fixed to the propeller shaft and a second end drivingly coupled to the inner race. The second end includes a portion positioned adjacent to the inner race that defines an outer diameter greater than an outer diameter defined by the interface between the inner race and the plurality of balls.

16 Claims, 3 Drawing Sheets

PROPSHAFT WITH CONSTANT VELOCITY JOINT ATTACHMENT

CROSS-REFERENCE TO RELATED APPLICATIONS

This application is a continuation of U.S. patent application Ser. No. 11/089,263 filed on Mar. 24, 2005, now U.S. Pat. No. 7,347,785. The disclosure of the above application is incorporated herein by reference.

BACKGROUND AND SUMMARY OF THE INVENTION

The present invention relates to a propeller shaft assembly and, more particularly, to the attachment of a stub shaft and an inner race of a constant velocity joint which provides for increased bending stiffness.

Typically, a vehicle propeller shaft drivingly interconnects a transmission assembly and an axle assembly such that the torque produced by the transmission is transferred through the propeller shaft to the axle thereby driving one or more of the vehicle wheels. Connecting assemblies drivingly connect the ends of the propeller shaft to any number of components including but not limited to a transmission, a power transfer unit, a torque transfer device or an independently mounted axle.

Another type of propeller shaft includes multiple shafts or segments which are drivingly connected together and rotatably supported by a propeller shaft bearing assembly. The propeller shaft segments typically include a connecting assembly which operatively connects or links the two shaft segments of the propeller shaft and a center bearing which rotatably supports the connecting assembly. One known connecting assembly includes a forged stub shaft having a large diameter shoulder on one end and a small diameter body with an external spline on the other end for insertion into the inner race of a constant velocity joint. The large diameter of the forged stub shaft is typically welded to the tube of the propeller shaft.

Many constant velocity joints are operable to allow an angulation between the axis of rotation of the stub shaft and the axis of rotation of the constant velocity joint outer race of 10 degrees or more. To achieve the maximum angulation of the constant velocity joint, the body portion of the stub shaft has a small outer diameter that is substantially smaller than outer diameter of the inner race.

The bending stiffness of a propeller shaft assembly is greatly influenced by the minimum diameter of the shaft and the length that the relatively small diameter extends from the loading points. Accordingly, the known forged stub shaft having a small diameter body may compromise the overall bending stiffness of the propeller shaft and, the longer the reduced body diameter extends, the lower the bending stiffness. It has been shown that the lower the bending stiffness, the more likely undesirable noise, vibration and harshness will be produced. Furthermore, existing propeller shaft assemblies may include a greater mass than necessary for transmitting rotary loads. Accordingly, it is desirable to reduce noise, vibration and harshness and reduce the weight of the propeller shaft assembly. Therefore, a need exists for an improved propeller shaft assembly having an increased bending stiffness and reduced mass.

The present invention includes a propeller shaft assembly having a substantially cylindrical hollow propeller shaft, a constant velocity joint having an inner race and an outer race drivingly interconnected by a plurality of balls, and a stub shaft. The stub shaft has a first end fixed to the propeller shaft and a second end drivingly coupled to the inner race. The second end includes a portion positioned adjacent to the inner race. The portion includes an outer diameter greater than an outer diameter defined by the interface between the inner race and the plurality of balls.

According to another aspect of the invention, the propeller shaft assembly includes a substantially cylindrical hollow propeller shaft, a constant velocity joint having an inner race and an outer race drivingly interconnected by a plurality of balls, and a hollow stub shaft. The hollow stub shaft includes a first open end fixed to the propeller shaft and a second open end drivingly coupled to the inner race.

These and other features, aspects and advantages of the invention will become apparent by reading the follow specification and by reference to the following drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
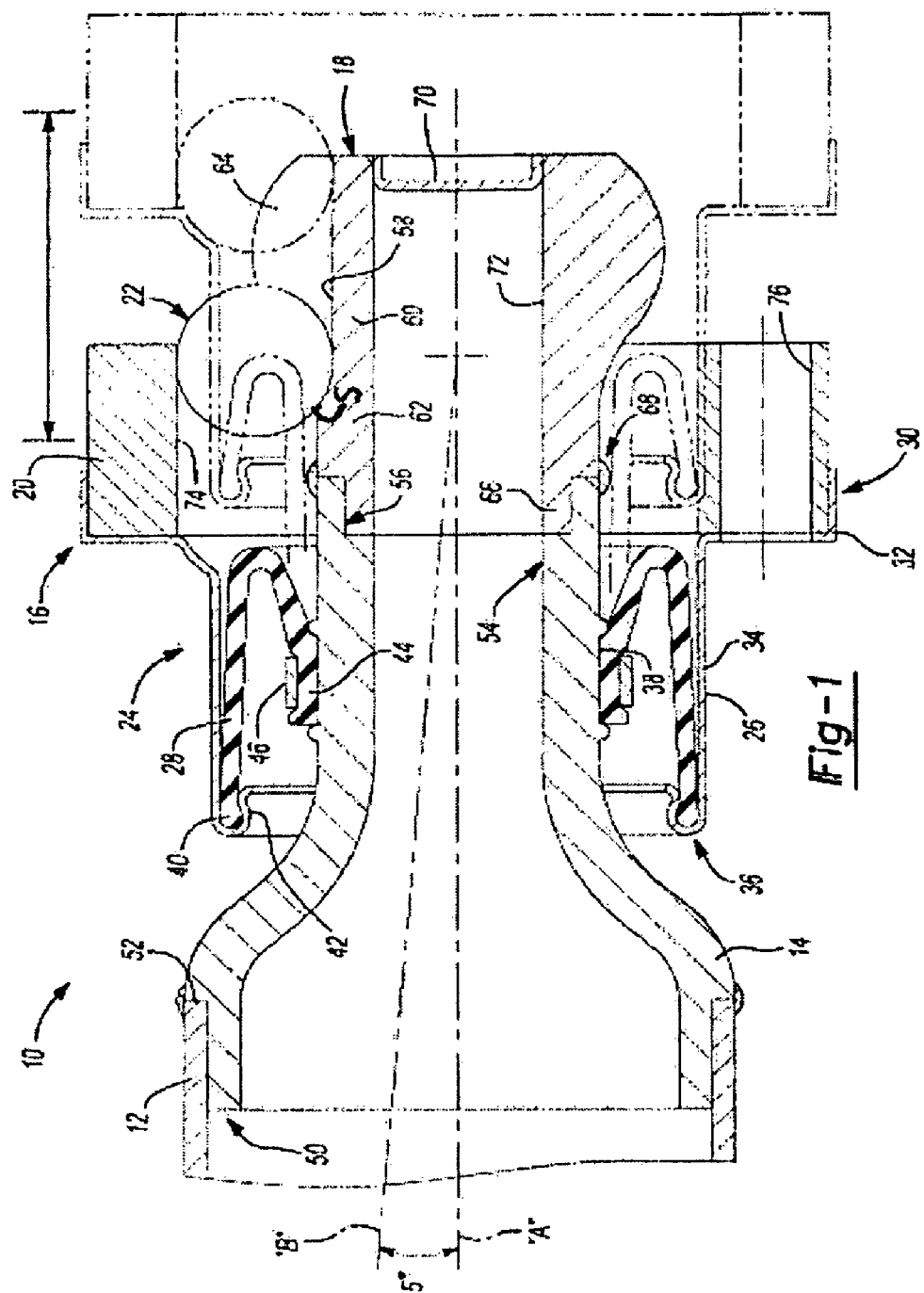
FIG. 1 is a cross-sectional view of a first embodiment propeller shaft assembly.

With reference to FIG. 1, a first embodiment propeller shaft assembly 10 includes a substantially cylindrical hollow propeller shaft 12, a stub shaft 14 and a constant velocity joint 16. Constant velocity joint 16 includes an inner race 18 and an outer race 20 drivingly interconnected with a plurality of balls 22. Constant velocity joint 16 also includes a cage (not shown) operable to maintain the axial alignment of balls 22. Propeller shaft 12, stub shaft 14 and inner race 18 are drivingly coupled to one another and rotate about a first axis "A". Outer race 20 rotates about a second axis "B". Constant velocity joint 16 is constructed to allow an angulation or misalignment between axis "A" and axis "B" up to about 5 degrees. A seal assembly 24 sealingly engages outer race 20 and stub shaft 14 to resist ingress of contamination to and retain grease within the region where the plurality of balls 22 engages the inner and outer race.

Seal assembly 24 includes a substantially rigid case 26 and an elastomeric boot 28. Case 26 is preferably made from a stamped sheet metal such as aluminum or steel and may alternately be constructed from a plastic material. Case 26 includes a first end 30 coupled to outer race 20. First end 30 includes an enlarged cup portion 32 in receipt of a portion of outer race 20. Case 26 includes a reduced diameter cylindrical section 34 positioned between first end 30 and a second end 36. Cylindrical portion 34 is sized to be spaced apart from an outer surface 38 of stub shaft 14 to allow room for boot 28 to be stored.

Boot 28 includes a first end 40 fixed to second end 36 of case 26 via a crimped section 42. A second end 44 of boot 28 is fixed to outer surface 38 of stub shaft 14 by a band clamp 46. Boot 28 is constructed of sufficient length and folded to accommodate relative axial movement between stub shaft 14 and outer race 20. Outer race 20 is movable relative to stub shaft 14 between a first position shown in solid lines and a second position shown in phantom line representation.

Stub shaft 14 is a tubular member having a first open end 50 with an enlarged diameter sized to mate with an open end 52 of propeller shaft 12. Propeller shaft 12 may be press-fit into engagement with first end 50 and subsequently welded to fix stub shaft 14 to propeller shaft 12. Stub shaft 14 includes a reduced diameter second end 54 with a counter-bore 56 for receipt of a portion of inner race 18 as will be described in greater detail hereinafter. Second end 54 includes outer surface 38 which defines a diameter greater than the diameter defined by a plurality of intersecting surfaces between balls 22 and a surface 58 of inner race 18. In this manner, the bending stiffness of the inner race, stub shaft and propeller shaft assembly, is increased by maximizing the outer diameters of these components. The surface 58 of the inner race 18 does not extend the full length of the inner race 18 and thus forms a stop S that limits movement of the balls 22. and thus the outer race 20. toward the propeller shaft 12. The diameter of outer surface 38 of second end 54 is smaller than a maximum outer diameter of inner race 18. The surface 58 upon which balls 22 engage is parallel to the first axis A.

Inner race 18 is a substantially hollow member having a body portion 60 and a tubular portion 62 extending from the body portion. The body portion 60 includes a plurality of recesses 64 circumferentially spaced apart from one another. Each recess 64 is in receipt of one of the balls 22. Tubular portion 62 includes a reduced diameter portion 66 positioned in press-fit engagement with counter-bore 56 of stub shaft 14. A weld 68 is added to the outer diameter to further fix inner race 18 to stub shaft 14. A plug 70 is secured within a bore 72 extending through inner race 18.

Outer race 20 includes a plurality of pockets 74 in receipt of balls 22. A plurality of bores 76 extend through outer race 20 for receipt of fasteners (not shown) operable to mount outer race 20 to another drive line member such as a rotatable housing, a yoke or other coupling member (not shown).

Figure 2:
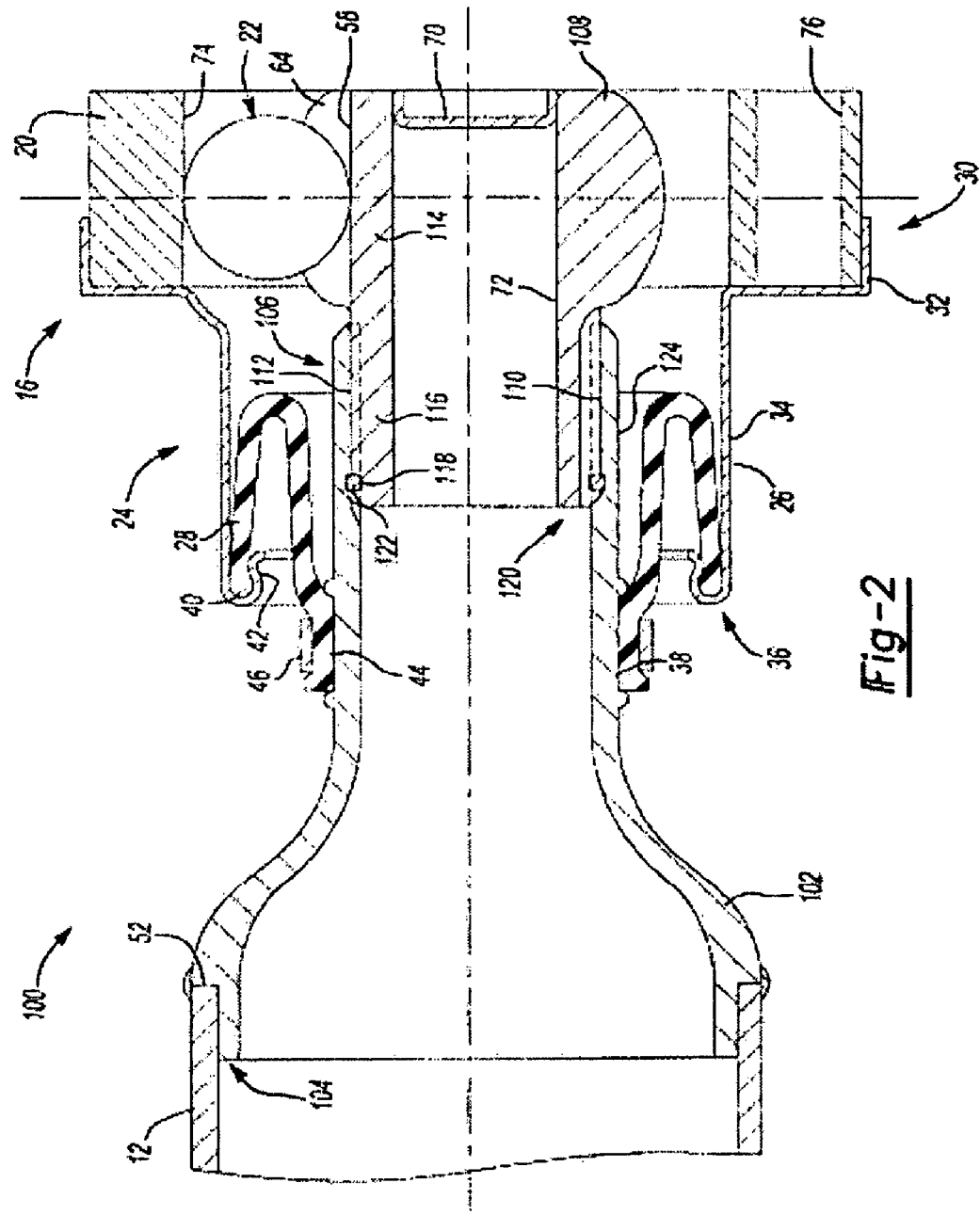
FIG. 2 is a cross-sectional view of a second embodiment propeller shaft assembly.

FIG. 2 depicts an alternate embodiment propeller shaft assembly 100. Propeller shaft assembly 100 functions substantially similarly to propeller shaft assembly 10. Accordingly, like elements will retain their previously introduced numerals. Furthermore, because propeller shaft assembly 100 functions substantially similarly to propeller shaft assembly 10, only the major differences between the embodiments will be described at this point in the specification.

Propeller shaft assembly 100 includes a stub shaft 102 having a first end 104 fixed to propeller shaft 12 and a second end 106 in splined engagement with an inner race 108. Second end 106 includes an internal spline 110 in driving engagement with an external spline 112 of inner race 108. The remainder of stub shaft 102 is substantially similar to stub shaft 14 and will not be described in greater detail.

Inner race 108 includes a body portion 114 and a tubular portion 116. Tubular portion 116 includes a ring groove 118 positioned near an end 120 of the tubular portion. A snap ring 122 is positioned within ring groove 118 to restrict relative axial movement between inner race 108 and stub shaft 102. Snap ring 122, ring groove 118 and internal splines 110 are designed to allow a technician to apply an impact force to inner race 108 to cause snap ring 122 to collapse and allow disassembly of inner race 108 from stub shaft 102 if the joint needs to be serviced.

It should be appreciated that an outer surface 124 of second end 106 defines a diameter greater than the diameter defined by the interface between balls 22 and recesses 64 occurring along surface 58. As previously mentioned, this geometrical feature substantially increases the bending stiffness of propeller shaft assembly 100 when compared to a stub shaft having an elongated reduced diameter body portion.

Figure 3:
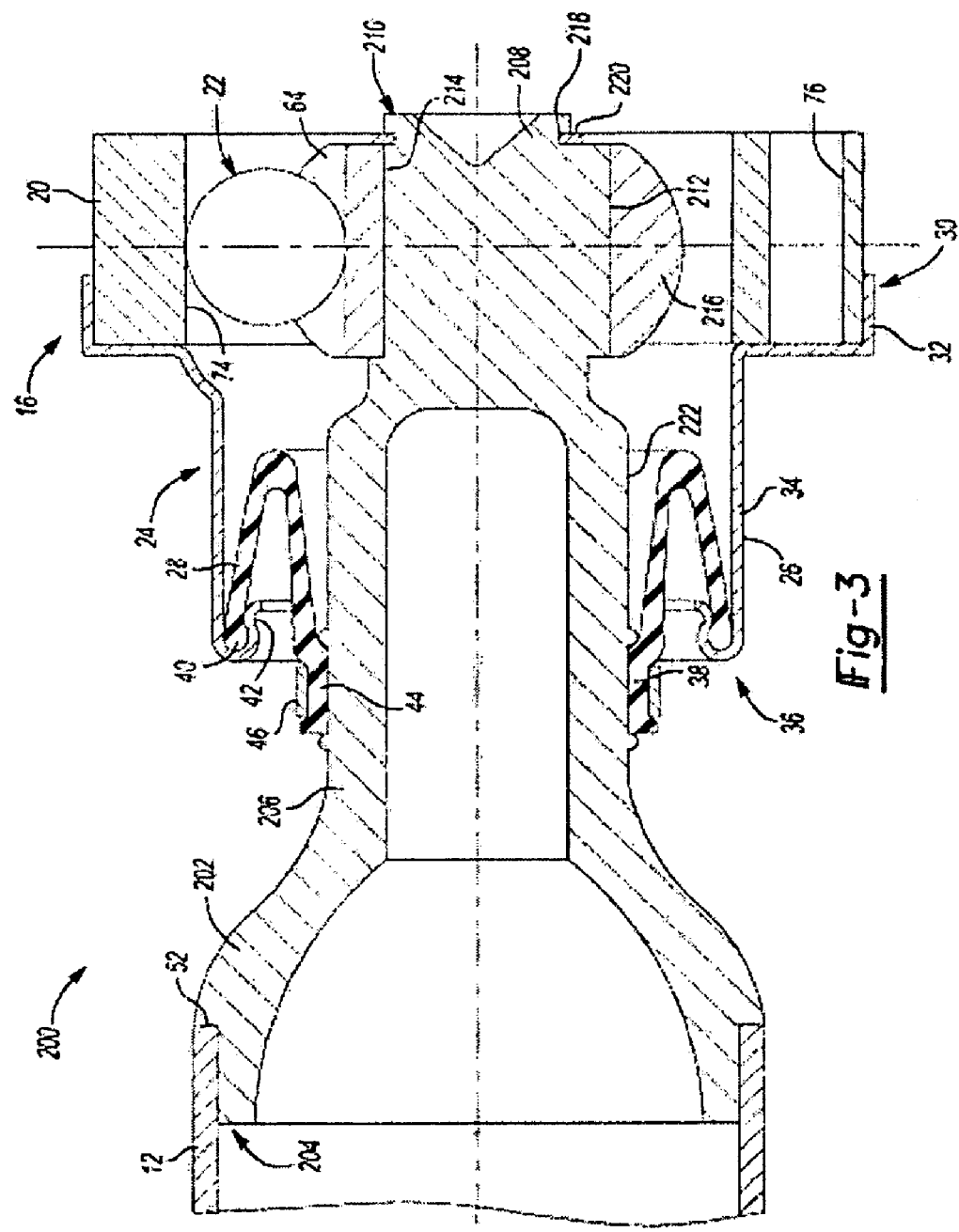
FIG. 3 is a cross-sectional view of a third embodiment propeller shaft assembly.

FIG. 3 depicts another alternate embodiment propeller shaft assembly shown at reference numeral 200. Propeller shaft assembly 200 functions substantially similarly to propeller shaft assembly 100 and propeller shaft assembly 10. Accordingly, like elements will retain their previously introduced reference numerals.

Propeller shaft assembly 200 includes a stub shaft 202 having a first end 204 fixed to propeller shaft 12. First end 204 is open and flared to an outer diameter substantially equal to the diameter of propeller shaft 12. Stub shaft 202 includes a reduced diameter hollow portion 206 and a further reduced diameter solid portion 208 positioned at a second end 210 of stub shaft 202. Solid portion 208 includes an external spline 212 drivingly engaged with an internal spline 214 formed on an inner race 216. A ring groove 218 is formed on solid portion 208 at second end 210 for receipt of a snap ring 220. Snap ring 220 functions to restrict relative axial motion between stub shaft 202 and inner race 216. One skilled in the art will appreciate that the outer diameter of stub shaft 202 increases almost immediately as solid portion 208 exits the inner diameter of inner race 216. In this manner, the outer diameter as defined by an outer surface 222 of hollow portion 206 is greater than a diameter defined by an interface of balls 22 and recesses 64. Accordingly, the length of any portion of stub shaft 202 having a reduced diameter is minimized thereby increasing the bending stiffness of the propeller shaft and stub shaft assembly.

Other advantages of the propeller shaft assembly embodiments previously described include substantial reduction in weight of the assembly due to the use of hollow, generally thin walled structures for the stub shaft and/or the inner race. The combination of the design features of increased outer stub shaft diameters along with hollow shaft members provides increased bending stiffness and reduced mass. Furthermore, it should be appreciated that these features provide for a propeller shaft assembly having a reduced likelihood to produce noise, vibration, or harshness during operation.

It will be understood that the invention is not to be limited to the exact construction which has been illustrated and discussed above, but that various changes and/or modifications may be made without departing from the spirit and the scope of the invention.

What is claimed is:

1. A propeller shaft assembly, comprising:
   a tubular propeller shaft;
   a constant velocity joint having an inner race and an outer race drivingly interconnected by a plurality of balls; and
   a stub shaft having a first end fixed to said propeller shaft and a second end drivingly connected to and in receipt of an end portion of said inner race, wherein said outer race is axially moveable between first and second positions relative to said inner race, said first position being axially closer to said propeller shaft than said second position, wherein said inner race has a stop preventing said outer race from axially moving beyond said first position toward said propeller shaft, wherein said inner race is rotatably driven about a first rotary axis common with said propeller shaft and said stub shaft, wherein said outer race rotates about a second rotary axis that is angulated relative to said first rotary axis at each of said first and second positions, wherein said second end of said stub shaft has an outer diameter that is smaller than a maximum outer diameter of said inner race, and wherein an outer surface on said inner race upon which said balls engage is parallel to said first rotary axis.

2. The propeller shaft assembly of claim 1 further including a seal assembly having a case secured to one of said outer race and said stub shaft and an elastomeric boot coupled to the other of said outer race and said stub shaft, said boot is operable to accommodate relative axial movement between said outer race and said stub shaft.

3. The propeller shaft assembly of claim 1 wherein one of said second end of said stub shaft and said end portion of said inner race includes a reduced diameter segment that is retained within a counterbore formed in the other of said second end of said stub shaft and said end portion of said inner race.

4. The propeller shaft assembly of claim 3 wherein said end portion of said inner race includes said reduced diameter segment that is in press-fit engagement with said counterbore formed in said second end of said stub shaft.

5. The propeller shaft assembly of claim 1 wherein said second end of said stub shaft is welded to said end portion of said inner race.

6. The propeller shaft assembly of claim 1 wherein said second end of said stub shaft has an outer diameter that is greater than an outer diameter surface on said inner race upon which said balls engage.

7. The propeller shaft assembly of claim 1 wherein said stub shaft is a tubular component having a larger diameter first open end fixed to said propeller shaft and a smaller diameter second open end fixed to said end portion of said inner race.

8. A propeller shaft assembly, comprising:
a propeller shaft;
a constant velocity joint having an inner race and an outer race drivingly interconnected by a plurality of balls; and
a tubular stub shaft having a first open end fixed to said propeller shaft and a second open end drivingly coupled to and in receipt of an end portion of said inner race, wherein said outer race is axially moveable between first and second positions relative to said inner race, said first position being axially closer to said propeller shaft than said second position, wherein said inner race has a stop preventing said outer race from axially moving beyond said first position toward said propeller shaft, wherein said inner race is rotatably driven about a first rotary axis common with said propeller shaft and said stub shaft, wherein said outer race rotates about a second rotary axis that is angulated relative to said first rotary axis at each of said first and second positions, wherein said second or en end of said stub shaft has an outer diameter that is smaller than a maximum outer diameter of said inner race, and wherein an outer surface on said inner race upon which said balls engage is parallel to said first rotary axis.

9. The propeller shaft assembly of claim 8 wherein said inner race includes a tubular portion extending from a body portion, said plurality of balls in engagement with said body portion and said stub shaft in engagement with said tubular portion.

10. The propeller shaft assembly of claim 9 wherein one of said tubular portion of said inner race and said second open end of said stub shaft includes a reduced diameter portion retained within a counterbore formed in the other of said tubular portion and said second open end.

11. The propeller shaft assembly of claim 10 wherein said tubular portion of said inner race includes said reduced diameter segment that is in press-fit engagement with said counterbore formed in said second end of said stub shaft.

12. The propeller shaft assembly of claim 8 wherein said second end of said stub shaft is welded to said end portion of said inner race.

13. The propeller shaft assembly of claim 8 wherein said second end of said stub shaft has an outer diameter that is greater than an outer diameter surface on said inner race upon which said balls engage.

14. The propeller shaft assembly of claim 8 wherein said stub shaft is a tubular component having a larger diameter first open end fixed to said propeller shaft and a smaller diameter second open end fixed to said end portion of said inner race.

15. A propeller shaft assembly, comprising:
a propeller shaft;
a constant velocity joint having an inner race and an outer race drivingly interconnected by a plurality of balls; and
a stub shaft having a first end fixed to said propeller shaft and a second end drivingly interconnected to said inner race, the interconnection between said inner race and said stub shaft being axially positioned between said plurality of balls and said propeller shaft, wherein said outer race is axially moveable between first and second positions relative to said inner race, said first position being axially closer to said propeller shaft than said second position, wherein said inner race has a stop preventing said outer race from axially moving beyond said first position toward said propeller shaft, wherein said inner race is rotatably driven about a first rotary axis common with said propeller shaft and said stub shaft, wherein said outer race rotates about a second rotary axis that is angulated relative to said first rotary axis at each of said first and second positions, wherein said second end of said stub shaft has an outer diameter that is smaller than a maximum outer diameter of said inner race, and wherein an outer surface on said inner race upon which said balls engage is parallel to said first rotary axis.

16. The propeller shaft assembly of claim 15 wherein a seal includes a first end coupled to said outer race and a second end coupled to said stub shaft, said interconnection being positioned beneath said seal.

* * * * *